(12) United States Patent
Jurrens (10) Patent No.: US 9,290,231 B1
(45) Date of Patent: Mar. 22, 2016

(54) VEHICLE SUSPENSION ELEMENT

(71) Applicant: Jesse Jurrens, Sturgis, SD (US)

(72) Inventor: Jesse Jurrens, Sturgis, SD (US)

(*) Notice: Subject to any disclaimer, the term of this patent is extended or adjusted under 35 U.S.C. 154(b) by 0 days.

(21) Appl. No.: 14/716,494

(22) Filed: May 19, 2015

(51) Int. Cl.
| F16F 9/04 | (2006.01) |
| B62K 25/26 | (2006.01) |
| B62K 25/20 | (2006.01) |
| B62K 25/28 | (2006.01) |
| F16F 9/56 | (2006.01) |
| B62K 11/02 | (2006.01) |
| F16F 9/088 | (2006.01) |
| B62K 25/04 | (2006.01) |

(52) U.S. Cl.
CPC ............. B62K 25/283 (2013.01); B62K 11/02 (2013.01); F16F 9/088 (2013.01); F16F 9/56 (2013.01); *B62K 2025/045* (2013.01)

(58) Field of Classification Search
CPC .......... B62K 25/283; B62K 2025/044; B62K 2015/045; B62K 25/005; F16F 9/56; F16F 9/088
USPC ........................................ 180/227; 267/64.24
See application file for complete search history.

(56) References Cited

U.S. PATENT DOCUMENTS

| 4,588,171 | A | * | 5/1986 | Stephens | F16F 9/46 188/318 |
| 4,688,774 | A | * | 8/1987 | Warmuth, II | B60G 13/001 267/152 |
| 4,712,638 | A | * | 12/1987 | Kawaguchi | B62K 21/005 180/219 |
| 4,880,979 | A | * | 11/1989 | Yoshida | H01L 31/024 250/338.4 |
| 4,993,508 | A | * | 2/1991 | Nozoe | B62K 25/005 180/219 |
| 5,067,580 | A | * | 11/1991 | Parker | B62M 17/00 180/219 |
| 6,286,820 | B1 | * | 9/2001 | Raulf | B60G 15/14 267/64.21 |
| 7,156,199 | B2 | * | 1/2007 | Takano | B62K 11/04 180/225 |
| 7,226,045 | B2 | * | 6/2007 | Brookes | B60G 13/003 188/321.11 |

* cited by examiner

*Primary Examiner* — Tony Winner
(74) *Attorney, Agent, or Firm* — Jeffrey A. Proehl; Woods, Fuller, Shultz & Smith, P.C.

(57) ABSTRACT

A suspension element for a vehicle may comprise a damper including a cylinder, a piston in the chamber, and a rod mounted on the piston such that the piston moves with the rod. A air spring support frame may comprise a first support element movable with the cylinder, and a second support element mounted on the rod to permitting rod movement with respect to the second support element. A air spring assembly may include a first air spring mount mounted to move with the rod, a second air spring mount on the second support element, and a tubular air spring mounted on the first and second air spring mounts and defining a air spring interior to hold a quantity of air. The air spring support frame may include at least two connector elements connecting the support elements and being spaced from each other and substantially rigid to maintain a predetermined spacing between the support elements.

17 Claims, 6 Drawing Sheets

VEHICLE SUSPENSION ELEMENT

BACKGROUND

Field

The present disclosure relates to vehicle suspensions and more particularly pertains to a new vehicle suspension element providing an adjustable ride height for a vehicle over a range of vehicle weight loadings.

SUMMARY

In one aspect, the present disclosure relates to a suspension element for connecting to a frame of a vehicle and a swing arm on which a wheel of the vehicle is mounted. The suspension element may comprise a first mount end and a second mount end, and a damper extending between the first mount end and the second mount end. The damper may comprise a cylinder defining a chamber, a piston being positioned in the chamber, and a rod extending into the chamber of the cylinder and extending out of one end of the cylinder. The rod has an external end located external to the chamber, and an internal end located in the chamber of the cylinder and mounted on the piston such that the piston moves with the rod. The element may further include a air spring support frame comprising a first support element movable with the cylinder, and a second support element mounted on the rod in a manner permitting the rod move with respect to the second support element. The element may further include a air spring assembly comprising a first air spring mount mounted on the rod to move with the rod, a second air spring mount mounted on the second support element of the air spring support frame, and a tubular air spring mounted on the first and second air spring mounts and having a flexible perimeter wall. The air spring may define a air spring interior configured to hold a quantity of air in the air spring interior. The air spring support frame may include at least two connector elements connecting the first and second support elements, with the connector elements being substantially rigid to maintain a predetermined spacing between the first and second support elements. The connector elements may be spaced from each other.

In another aspect, the disclosure relates to a motorcycle comprising a frame, a swing arm pivotally mounted on the frame, a wheel mounted on the swing arm; and a suspension element connected to the frame and the swing arm. The suspension element may have a first mount end mounted on one of the frame and the swing arm, and a second mount end mounted on another one of the frame and the swing arm. The suspension element may also include a damper extending between the first mount end and the second mount end. The damper may comprise a cylinder defining a chamber, a piston being positioned in the chamber, and a rod extending into the chamber of the cylinder and extending out of one end of the cylinder. The rod has an external end located external to the chamber, and an internal end located in the chamber of the cylinder and mounted on the piston such that the piston moves with the rod. The element may further include a air spring support frame comprising a first support element movable with the cylinder, and a second support element mounted on the rod in a manner permitting the rod move with respect to the second support element. The element may further include a air spring assembly comprising a first air spring mount mounted on the rod to move with the rod, a second air spring mount mounted on the second support element of the air spring support frame, and a tubular air spring mounted on the first and second air spring mounts and having a flexible perimeter wall. The air spring may define a air spring interior configured to hold a quantity of air in the air spring interior. The air spring support frame may include at least two connector elements connecting the first and second support elements, with the connector elements being substantially rigid to maintain a predetermined spacing between the first and second support elements. The connector elements may be spaced from each other.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein.

DETAILED DESCRIPTION

With reference now to the drawings, and in particular to FIGS. 1 through 6 thereof, a new vehicle suspension element embodying the principles and concepts of the disclosed subject matter will be described.

The applicant has recognized that suspension elements that combine a damper component with an airbag component, such as is disclosed in U.S. Pat. Nos. 6,905,126; 7,798,295; and 8,307,963, each of which was invented by the applicant and each of which is hereby incorporated by reference in its entirety. The disclosed suspension elements are highly useful and effective when incorporated into the suspension of a vehicle, and in particular a motorcycle. Despite the advantages provided by such devices, the applicant has recognized that further improvement in such elements is possible. For example, the applicant has recognized that a change in the configuration of such suspension elements can permit the utilization of lighter weight materials as well as less complicated and time-consuming assembly processes while having a more rigid structure. The applicant has also recognized that a design that provides a longer air spring capable of holding a greater volume of air for improved ride characteristics. The applicant also realized that a larger damper body may be utilized if the air spring is moved out of an enclosure canister to a frame with substantially open sides.

Figure 6:
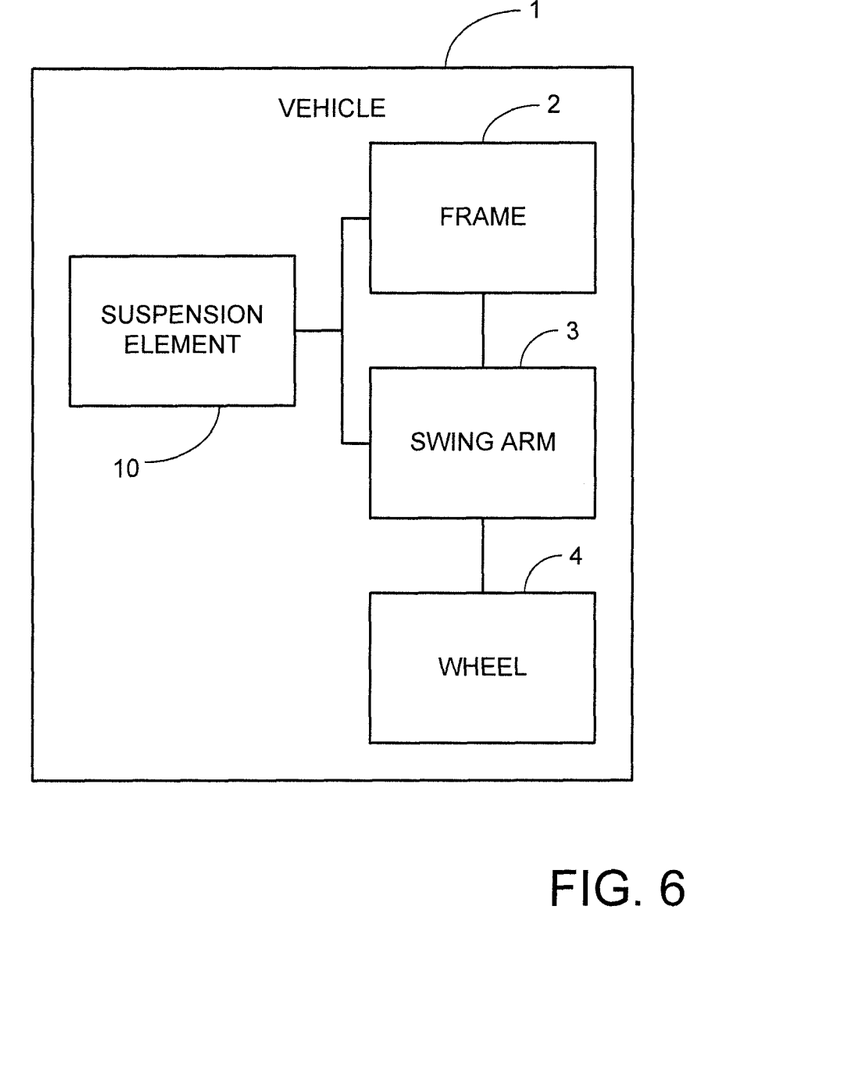
FIG. 6 is a schematic diagram of a system including elements of a vehicle and the suspension element, according to an illustrative embodiment.

In some aspects, the disclosure relates to a suspension element 10, and in other aspects the disclosure relates to the suspension elements in combination with elements of a vehicle 1, such as, but not limited to a motorcycle. The vehicle 1 may have a frame 2 and a swing arm 3 which is movably mounted on the frame 2 and on which a wheel 4 of the vehicle may be mounted. Typically the suspension element 10 is employed to control or dampen the movement of the swing arm 3 with respect to the frame 2 to enhance the quality of the ride experienced by an operator of the vehicle, such as motorcycle rider.

The suspension element 10 may include a first mount end 12 and a second mount end 16 with one of the mount ends generally being mounted on the frame 2 of the vehicle and the other mount end being mounted on the swing arm 3 of the vehicle. Typically the points of mounting to the frame and to the swing arm are located a distance away from the point of mounting (such as a pivot mounting) of the swing arm to the frame. In the illustrative embodiments, the first mount end comprises an eye 14 for receiving a fastener such as a bolt to connect the eye to the frame or swing arm, and the second mount end comprises a post 18 for extending into a structure on the frame or swing arm. Other types of mounting configurations may also be employed.

The suspension element 10 may include a damper 20 or shock absorber which may be mounted on the first mount end 12 and the second mount end 16 of the element 10. The damper 20 may thus extend between the frame and the swing arm of the vehicle. The damper 20 may include a cylinder 22 which defines a chamber 24, with the cylinder generally being elongated with opposite cylinder ends 26, 27 and the chamber 24 being similarly elongated. In some embodiments, one of the cylinder ends may be mounted on (or form) the first mount end 16. The damper 20 may also include a rod 28 that extends into the chamber 24 of the cylinder and passes out of one of the cylinder ends of the cylinder 22. The rod 28 may have an internal end 30 located in the chamber and an external end 31 located external to the chamber. The external end 31 may be configured to form a portion of the second mount end 16 and may have threads formed thereon to form the post 18. The damper 20 may also include a piston 32 which is mounted on the internal end 30 of the rod and may be positioned in the chamber 24. A suitable medium may also be positioned in the chamber to provide a degree of resistance to the movement of the piston 32 within the chamber 24. In some embodiments, the medium may be a substantially incompressible fluid such as a liquid, and in embodiments the medium may include a compressible fluid, such as a gas. For example, the liquid could be an oil, and the gas could be air.

The suspension element 10 may also include a air spring support frame 34. The air spring support frame 34 may include a first support element 36 which is positioned about the cylinder 22 of the damper and may be mounted so as to be substantially immovable with respect to the cylinder and the cylinder and the first support element move as a unit generally in a longitudinal direction of the element 10. The first support element 36 may be fixed to the cylinder 22 in a suitable manner. Illustratively, the first support element 36 may have a first aperture 38 formed therein to permit the cylinder to pass at least partially through the element 36, and the first support element may be fixed to the exterior of the cylinder, such as through the use of a shoulder formed on the exterior of the cylinder and a securing clip, such as a C-clip, although other means of securing the parts together may be employed. The first support element 36 may also have at least one corner 39, and may include a plurality of corners. In some embodiments, the first support element may be generally rectangular with four corners 39. In the illustrative embodiments, the corners are formed into two pairs of corners, and the corners of each pair are located closer to each other than to the corners of the pairs to produce a relatively narrower profile in one dimension as compared to another perpendicular dimension which may be beneficial in vehicle applications where the available space for the elements is narrower in one direction than in another direction.

The air spring support frame 34 may also include a second support element 40 which is mounted on the rod 28 of the damper 20 in a manner such that the rod is able to move substantially freely with respect to the second support element 40, and the element 40 does not move with the rod 28. In some embodiments, the second support element 40 may be configured similar to the first support element, and may have a substantially similar size and/or shape. Illustratively, the second support element may include at least one corner 41 and in some embodiments may be rectangular with four corners. The second support element 40 may have a second aperture 42 to permit the rod of the damper to pass through the support element 40 and move with respect to the element 40.

The air spring support frame 34 may also include at least one connector element 44 for connecting the first 36 and second 40 support elements together. The connector element 44 may be substantially rigid in character to maintain a predetermined spacing between the first and second support elements connected by connector element 44. In the illustrative embodiments, a plurality of the connector elements 44 are included in the support frame 34 and are each connected to the first and second support elements to maintain the support elements at the predetermined spacing. The connector elements 44 may be positioned on substantially opposite locations on the support elements, and multiple connector elements may be grouped together at the substantially opposite locations. In other embodiments, the plurality of connector elements may be substantially equally angularly spaced from each other about the central longitudinal axis of the damper 20. The plurality of connector elements 44 may comprise four connector elements, and each of the connector elements may be positioned at one of the corners 39, 41 of the respective first 36 and second 40 support elements. In the illustrative embodiments, the connector elements 44 comprise rods which may have a substantially cylindrical exterior shape although other exterior shapes may be employed for the connector elements. Each rod 44 may have an end with a threaded bore extending into the end, with a fastener 46 passing through a hole 48 in a support element and being threaded into the threaded bore of the connector element to thereby mount the connector element and the support element together. A fastener 49 may be mounted on the rod 28 of the damper to fasten the rod to a portion of the swing arm or the frame of the vehicle.

The suspension element 10 may also include a air spring assembly 50 which, in addition to the damper 20, provides a second constraint upon the movement of the swing arm 3 with respect to the frame 2 of the vehicle 1. The air spring assembly 50 contains a quantity of a gas, which is referred to as air for the purposes of this description but could also include other gases, pure or mixed. The air spring assembly may hold a fixed quantity of air that does not significantly vary during use of the suspension element, but the quantity of air may be increased or decreased to adjust aspects of the suspension element such as, for example, the ride height of the vehicle on which the element 10 is mounted. The air spring assembly 50 may include a first air spring mount 52 mounted on the rod 28 such that the mount 52 moves with the rod, as a unit with the rod, and generally with respect to the cylinder. The first air spring mount 52 may have a first perimeter 54, and the first perimeter may be substantially circular. Illustratively, the first air spring mount 52 may include a air spring support sleeve 56, and the first perimeter 54 may be formed by the sleeve 56. The first air spring mount may also include a first retainer ring 58. The first air spring mount 52 may comprise a support wall 57 secured to the sleeve 56 and to the rod 28 such that the support wall (and the sleeve 56) move with the rod as the rod moves with respect to the cylinder. The support wall 57 may bear against the end of the cylinder or a bumper element on the end of the cylinder.

The air spring assembly 50 may further include a second air spring mount 60 which is moves freely with respect to the rod 28, and may be connected to or mounted on the second support element 40 of the air spring support frame. The second air spring mount 60 may have a second perimeter 62, which may be substantially circular in shape. The second air spring mount 60 may comprise a disc 64 mounted on the second support element 40 and the disc 64 may form the second perimeter 62. The second air spring mount 60 may also include a second retainer ring 66.

The air spring assembly 50 may also include a tubular air spring 68 which is mounted on the first 52 and second 60 air spring mounts and may have a flexible perimeter wall formed from a flexible material. The air spring 68 may define a air spring interior 70 therein, and may be configured to hold a quantity of air (or other suitable gas) in the air spring interior. The air spring 68 may be configured to hold a quantity of air at a pressure that is greater than atmospheric pressure. The perimeter wall of the air spring 68 may have limited extensibility in a longitudinal direction between a air spring first end 72 which is mounted on the first air spring mount 52 and a air spring second end 74 which is mounted on the second air spring mount 60. The first retainer ring 58 may be configured to press the air spring first end 72 against the first perimeter 54 on the sleeve. The second retainer ring 66 may be configured to press the air spring second end 74 against the second perimeter 62 on the disc 64.

The air spring assembly 50 may also include an inflation port 76 which is in communication with the air spring interior 70 to permit air or other suitable gas to be introduced into, or removed from, the air spring interior to adjust the gas pressure level in the air spring interior. Illustratively, the inflation port 76 may be mounted on the second support element 40 with a corresponding passage through the second air spring mount 60.

In use, as the vehicle 1 is burdened by the rider(s) and cargo, the additional weight causes the damper 20 of the suspension element 10 to extend and the air spring 68 of the element 10 to compress. As the air spring 68 compresses, the volume of air inside the air spring is reduced in relation to the stroke. This action increases the pressure of the air inside the air spring 68, thus increasing the supporting force as well. This characteristic provides a progressive suspension without the complexity of a mechanical linkage. The addition of air to the air spring, or subtraction of air from the air spring, provides an infinite range of adjustment of the supporting or resisting force provided by the air spring to allow the suspension element performance characteristics to be tailored to the riding conditions and/or the rider's preferences.

Figure 1:
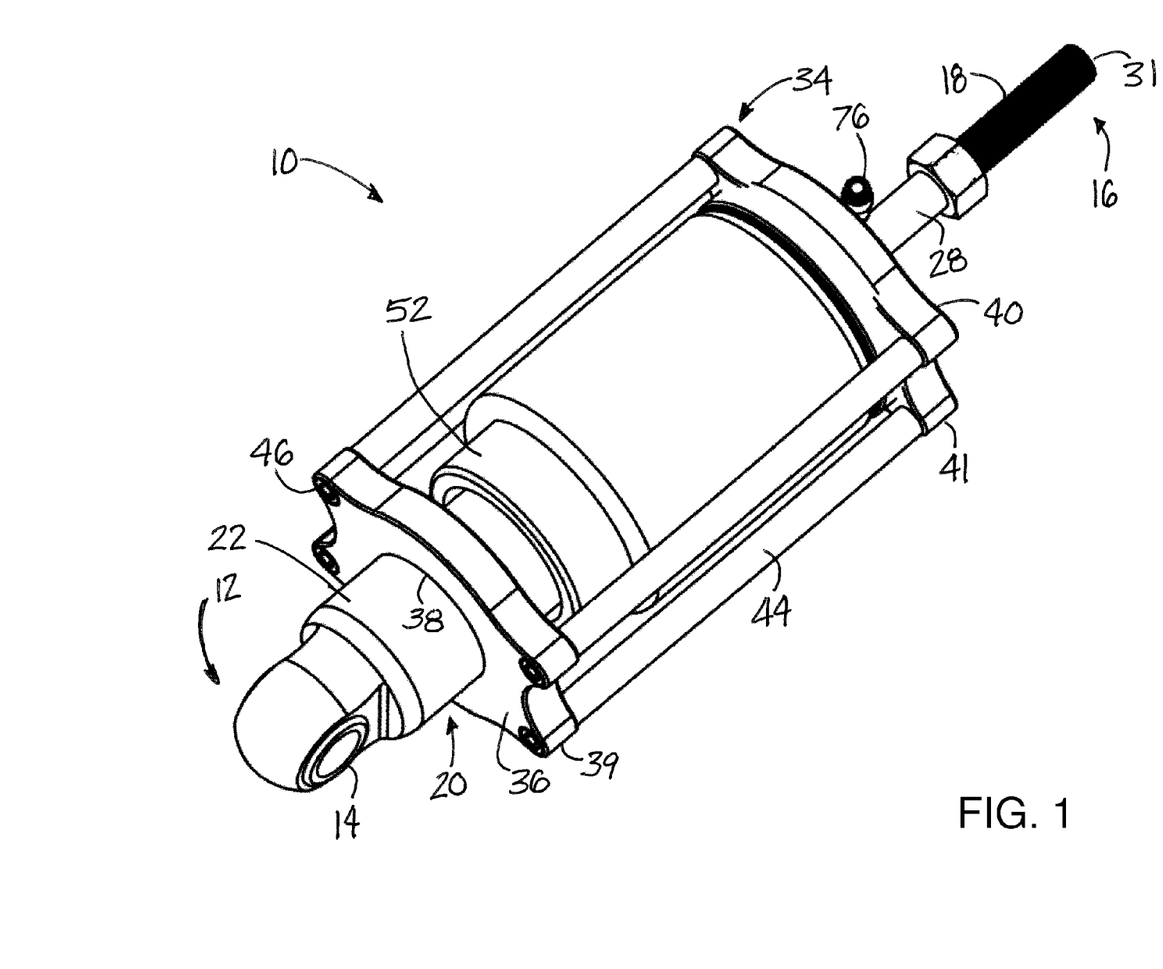
FIG. 1 is a schematic perspective view of a new vehicle suspension element according to the present disclosure.
Figure 2:
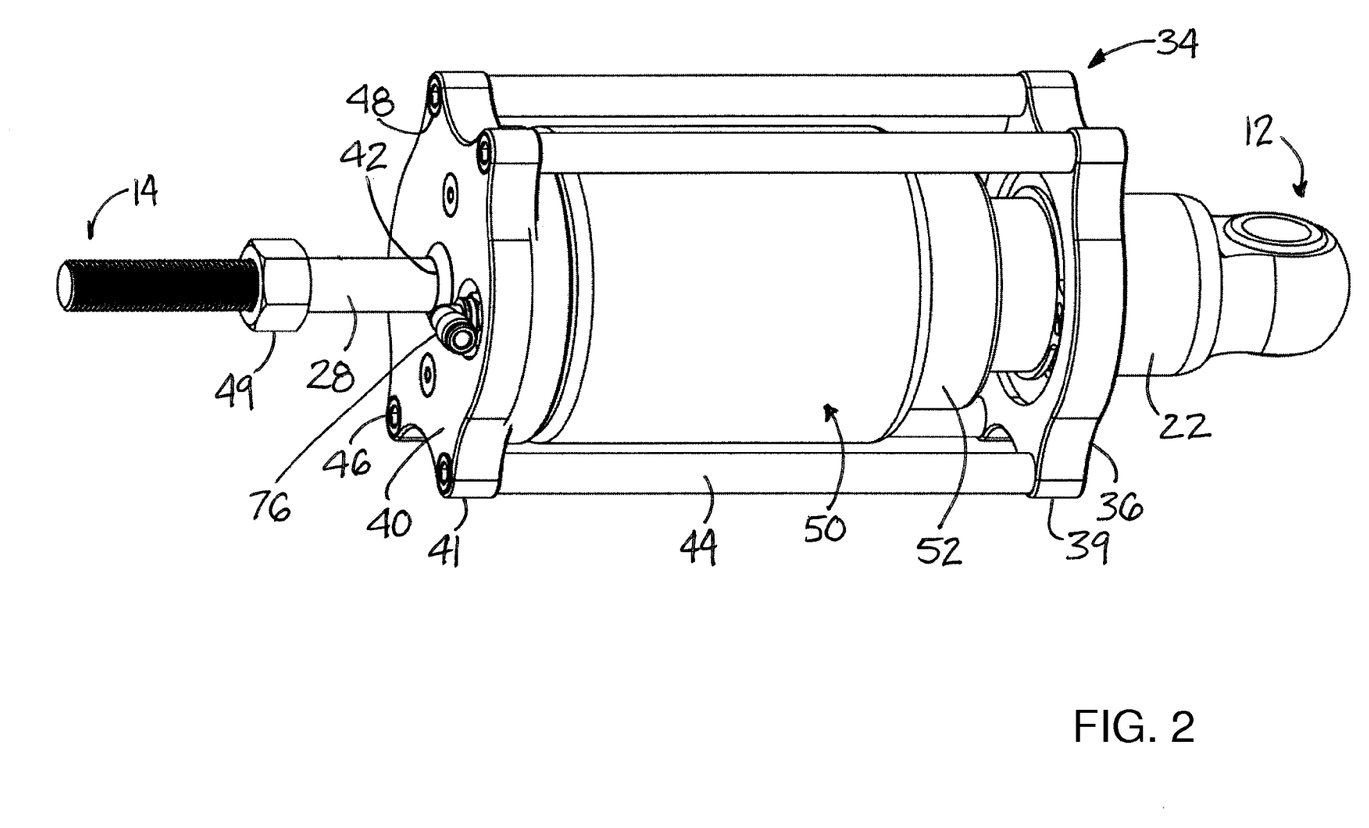
FIG. 2 is another schematic perspective view of the vehicle suspension element according to the present disclosure.

When substantially all air pressure is released from the air spring 68, collapsing the air spring, the damper 22 is extended (see FIG. 2, compressing the rear suspension, and causing piston 32 to make contact with the interior of the cylinder end 27 and lowering the rear end of the motorcycle to its relatively lowest ride height.

Figure 3:
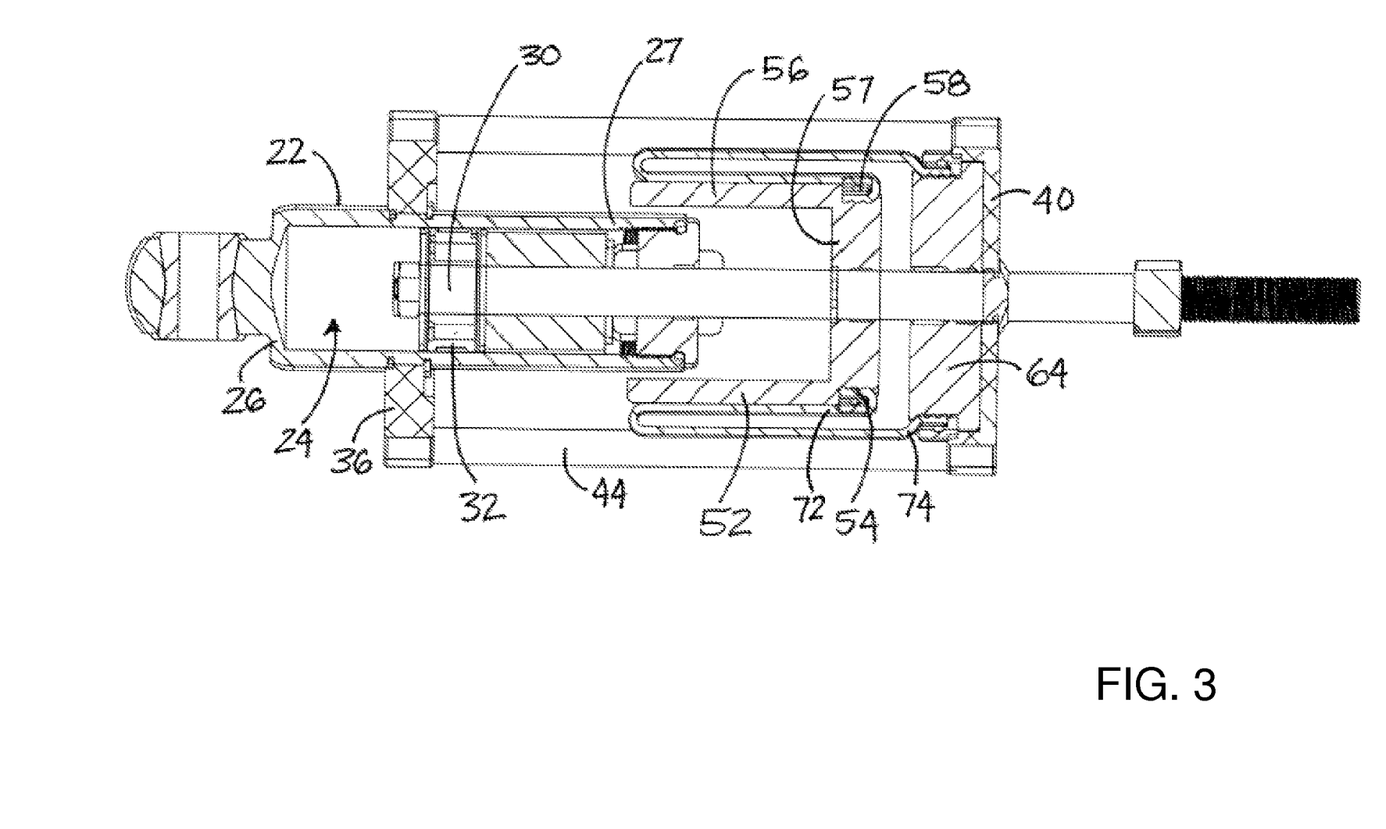
FIG. 3 is a schematic sectional view of the suspension element shown with the damper rod extended and the air spring interior substantially deflated, according to an illustrative embodiment.
Figure 4:
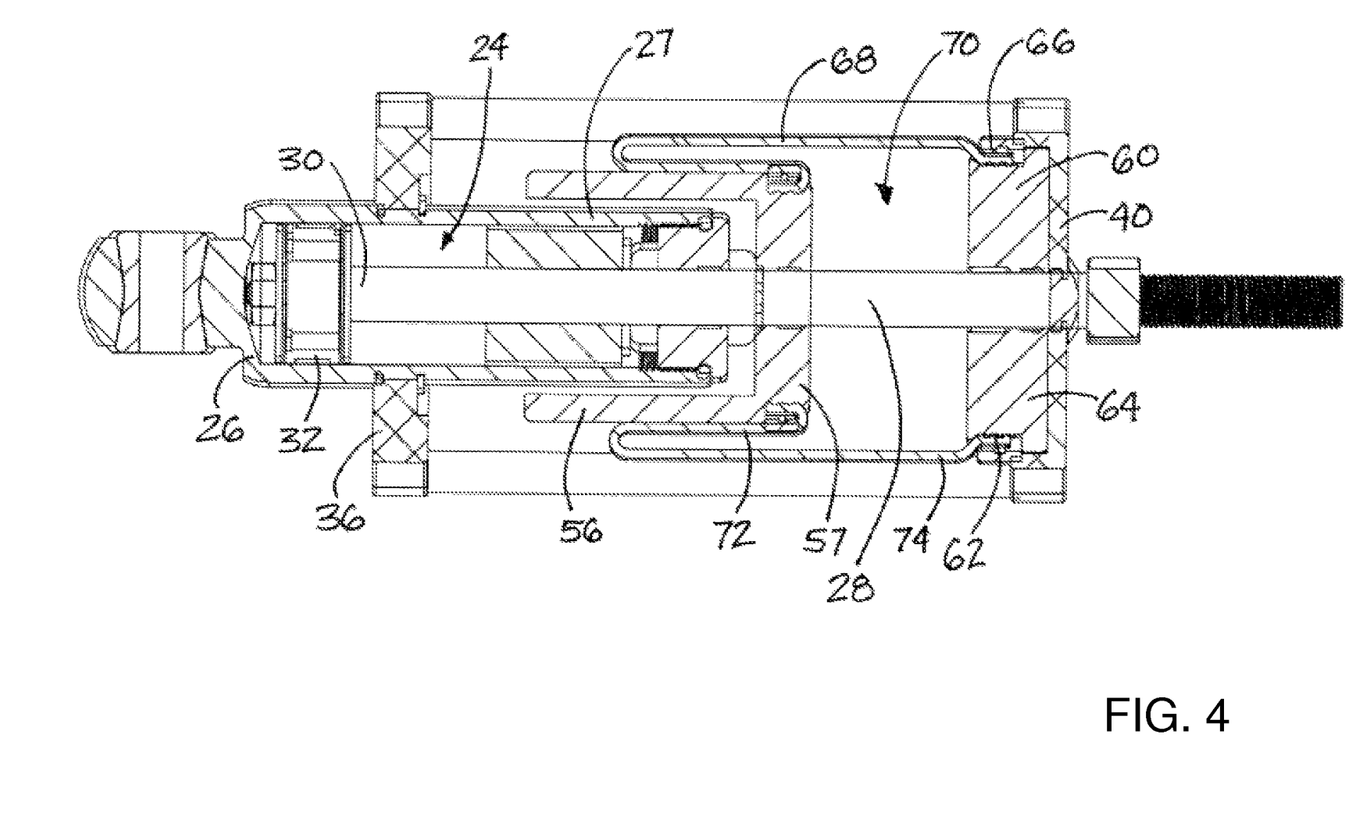
FIG. 4 is a schematic sectional view of the suspension element shown with the damper rod retracted and the air spring interior inflated, according to an illustrative embodiment.
Figure 5:
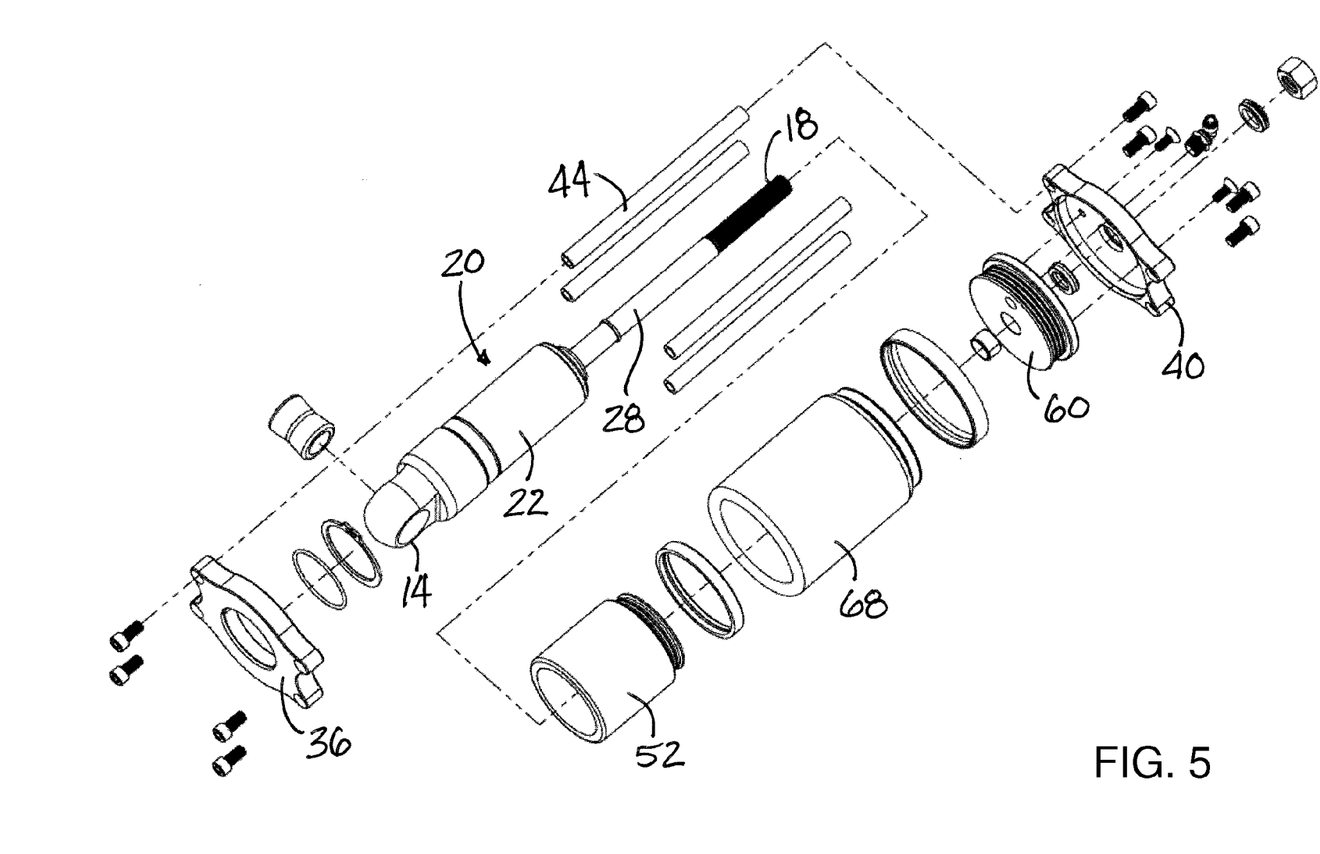
FIG. 5 is a schematic exploded view of the suspension element, according to an illustrative embodiment.

As pressurized air is introduced into the air spring interior 70, the piston 32 may travel away from the end of the cylinder interior and toward the opposite end 26 of the cylinder (see FIG. 3). The suspension element 10 may begin to compress and the suspension of the motorcycle may begin to extend and raise the rear end of the frame of the motorcycle. As more air is introduced into the air spring interior and the air pressure in the air spring increases, the piston 32 travels further toward the cylinder end 26, and may fully compress the suspension element 10 and the rear suspension may be more fully extended, raising the rear end of the frame of the motorcycle to its relatively highest ride height.

It should be appreciated that in the foregoing description and appended claims, that the terms "substantially" and "approximately," when used to modify another term, mean "for the most part" or "being largely but not wholly or completely that which is specified" by the modified term.

It should also be appreciated from the foregoing description that, except when mutually exclusive, the features of the various embodiments described herein may be combined with features of other embodiments as desired while remaining within the intended scope of the disclosure.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

I claim:

1. A suspension element for connecting to a frame of a vehicle and a swing arm on which a wheel of the vehicle is mounted, the suspension element comprising:
   a first mount end and a second mount end;
   a damper extending between the first mount end and the second mount end, the damper comprising a cylinder defining a chamber, a piston being positioned in the chamber, and a rod extending into the chamber of the cylinder and extending out of one end of the cylinder, the rod having an external end located external to the chamber and an internal end located in the chamber of the cylinder and mounted on the piston such that the piston moves with the rod;

an air spring support frame comprising a first support element movable with the cylinder, a second support element mounted on the rod in a manner permitting the rod move with respect to the second support element;

an air spring assembly comprising a first air spring mount mounted on the rod to move with the rod, a second air spring mount mounted on the second support element of the air spring support frame, and a tubular air spring mounted on the first and second air spring mounts and having a flexible perimeter wall, the air spring defining a air spring interior configured to hold a quantity of air in the air spring interior; and wherein the air spring support frame includes at least two connector elements connecting the first and second support elements, the connector elements being substantially rigid to maintain a predetermined spacing between the first and second support elements, the connector elements being spaced from each other.

2. The element of claim 1 wherein the connector elements are positioned at substantially opposite locations with respect to the air spring.

3. The element of claim 1 wherein the at least two connector elements comprise four connector elements.

4. The element of claim 1 wherein the connector elements comprise rods.

5. The element of claim 1 wherein the connector elements are spaced from the air spring.

6. The element of claim 1 wherein a quantity of air in the air spring interior is adjustable.

7. The element of claim 6 wherein the air spring assembly includes an inflation port in communication with the air spring interior to permit air to be introduced into or removed from the air spring interior to adjust an air pressure level in the air spring interior.

8. The element of claim 1 wherein an end of the cylinder forms a portion of the first mount end and the external end of the rod of the damper forms a portion of the second mount end.

9. The element of claim 1 wherein the first support element of the air spring support frame is mounted on the cylinder and positioned about the cylinder.

10. The element of claim 1 wherein the first air spring mount includes a sleeve and a support wall, the support wall being fixed to the rod to move with the rod.

11. The element of claim 1 wherein the first and second support elements each has a corner for each of the connector elements of the air spring support frame.

12. A motorcycle comprising:
a frame;
a swing arm pivotally mounted on the frame;
a wheel mounted on the swing arm; and
a suspension element connected to the frame and the swing arm, the suspension element comprising:
a first mount end mounted on one of the frame and the swing arm, and a second mount end mounted on another one of the frame and the swing arm;
a damper extending between the first mount end and the second mount end, the damper comprising a cylinder defining a chamber, a piston being positioned in the chamber, and a rod extending into the chamber of the cylinder and extending out of one end of the cylinder, the rod having an external end located external to the chamber and an internal end located in the chamber of the cylinder and mounted on the piston such that the piston moves with the rod;
an air spring support frame comprising a first support element movable with the cylinder, a second support element mounted on the rod in a manner permitting the rod move with respect to the second support element;
an air spring assembly comprising a first air spring mount mounted on the rod to move with the rod, a second air spring mount mounted on the second support element of the air spring support frame, and a tubular air spring mounted on the first and second air spring mounts and having a flexible perimeter wall, the air spring defining an air spring interior configured to hold a quantity of air in the air spring interior; and
wherein the air spring support frame includes at least two connector elements connecting the first and second support elements, the connector elements being substantially rigid to maintain a predetermined spacing between the first and second support elements, the connector elements being spaced from each other.

13. The motorcycle of claim 12 wherein the connector elements are positioned at substantially opposite locations with respect to the air spring.

14. The motorcycle of claim 12 wherein the at least two connector elements comprise four connector elements.

15. The motorcycle of claim 12 wherein the connector elements comprise rods.

16. The motorcycle of claim 12 wherein the quantity of air in the air spring interior is adjustable.

17. The motorcycle of claim 16 wherein the air spring assembly includes an inflation port in communication with the air spring interior to permit air to be introduced into or removed from the air spring interior to adjust an air pressure level in the air spring interior.

* * * * *